United States Patent

Lewis

[11] Patent Number: 6,035,966
[45] Date of Patent: Mar. 14, 2000

[54] HARNESS TREE SEAT WITH ASCENDER

[75] Inventor: Kenneth D. Lewis, Wisconsin Rapids, Wis.

[73] Assignee: K D L Outdoor Products, Inc., Wisconsin Rapids, Wis.

[21] Appl. No.: 09/162,571

[22] Filed: Sep. 29, 1998

[51] Int. Cl.[7] .................................................. A01M 31/00
[52] U.S. Cl. .............................. 182/7; 182/187; 182/150; 182/9
[58] Field of Search .............................. 182/7, 150, 187, 182/9

[56] References Cited

U.S. PATENT DOCUMENTS

| 272,129 | 2/1883 | Edmonds | 182/7 |
|---|---|---|---|
| 484,093 | 10/1892 | Goltermann | 182/150 |
| 918,275 | 4/1909 | Broome | 182/150 |
| 2,254,179 | 8/1941 | Hoyt . | |
| 4,527,660 | 7/1985 | Andruchiw . | |
| 4,553,634 | 11/1985 | Roberts et al. . | |
| 4,625,833 | 12/1986 | Lewis . | |
| 4,673,059 | 6/1987 | Kurtgis | 182/150 |
| 4,921,069 | 5/1990 | Boyles . | |
| 4,923,048 | 5/1990 | Cole | 182/9 |
| 5,131,490 | 7/1992 | Bell . | |
| 5,180,030 | 1/1993 | Smaby | 182/187 |
| 5,341,896 | 8/1994 | Amacker . | |
| 5,515,943 | 5/1996 | Antonelli . | |

FOREIGN PATENT DOCUMENTS

| 530286 | of 1921 | France | 182/7 |
|---|---|---|---|
| 2639546 | 6/1990 | France | 182/7 |
| 24 005 | of 1935 | Germany | 182/7 |
| 710 340 | 9/1941 | Germany | 182/9 |

OTHER PUBLICATIONS

"Bun Buddy Tree Seat" –K.D.L. Outdoor Products, Inc.–http://www.kdloutdoor.com/bun.html.
"LOC–ON HIGH STYLE" http://www.bowhunting.net/locon/97highstyle.html.

Primary Examiner—Alvin Chin-Shue
Attorney, Agent, or Firm—Lathrop & Clark LLP

[57] ABSTRACT

Adjustable upper straps extend from the four corners of a collapsible seat assembly and terminate at a central O-ring. A groin strap extends from the central ring to a portion of the seat assembly. A tree ascender strap is also connected to the central ring, and has a latchable hook which can be used to encircle the trunk of a tree and secure the climber as he climbs. A back strap and shoulder strap extend from the central ring and help to restrain a hunter within the assembly both while climbing and while in an elevated position in the tree. A main lead securing strap extends from an extension strap connected to the central ring and has a buckle which allows it to be secured around a tree above the head of the hunter. The main lead securing strap is looped through itself in such a way that the strap chokes the tree trunk within itself to prevent slipping on trees with smooth bark. In a preferred embodiment the seat assembly has two identical seat segments which are hinged to a rigid downwardly extending spar, with a plurality of straps in tension serving to keep the seat assembly in its erected condition when in use. Alternatively, collapsible seat assemblies employing flexible strap webs may be used.

23 Claims, 6 Drawing Sheets

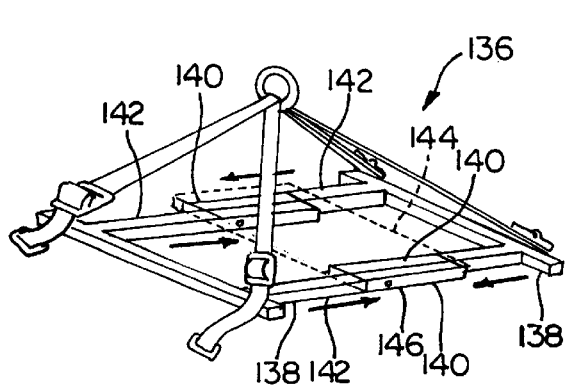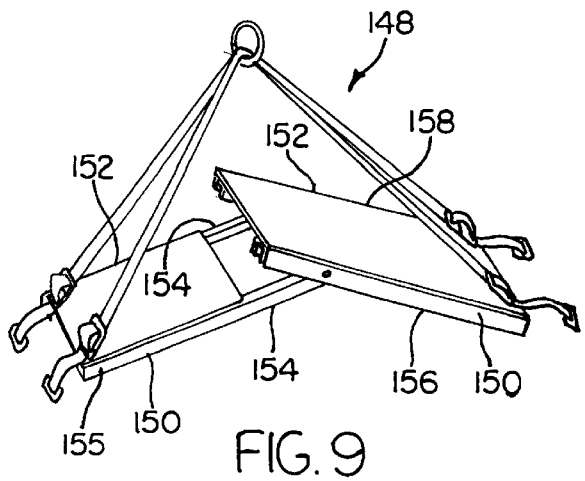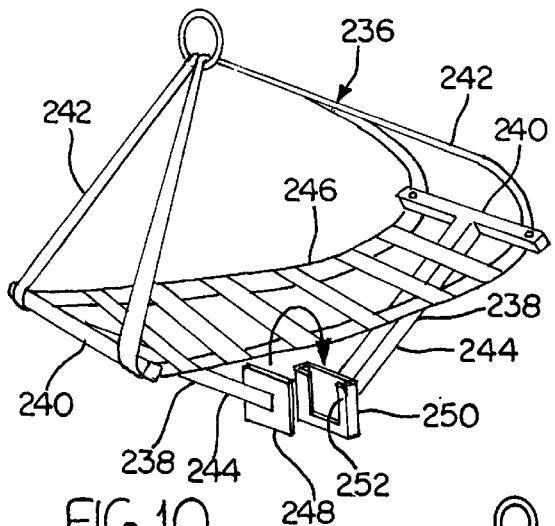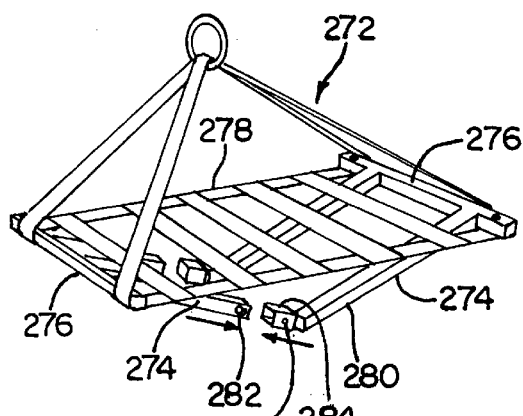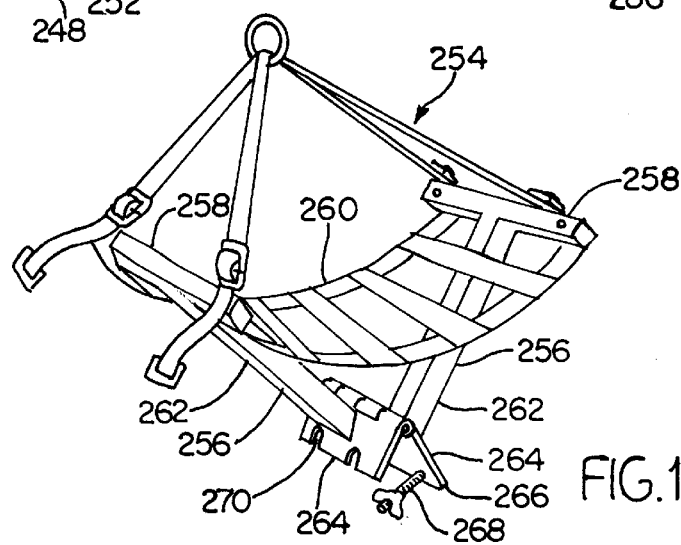

6,035,966

HARNESS TREE SEAT WITH ASCENDER

BACKGROUND OF THE INVENTION

The present invention relates generally to apparatus for supporting a person in an elevated position within a tree, and more particularly to such apparatus which also provides support to the person when climbing the tree.

Hunting, even with modern tools, demands patience, stealth, and attentiveness of the hunter. For the hunter to even have an opportunity to strike the game, be it with rifle, carbine, or bow, it is essential that the targeted game come within range of the hunter. There are two main approaches to acquiring the game: stalking or lying in wait.

The hunter may lie in wait at ground level behind vegetation cover or within a hunting blind. However, ground level positions generally offer limited visibility, as well as a limited range of coverage. Moreover, because the game's field of view is generally directed at ground level, greater camouflage and concealment must be employed. To give a more expansive field of view while at the same time employing environmental camouflage, many hunters chose to conceal themselves at an elevated position within the branches of a tree.

Tree mounted hunting has demonstrated its effectiveness for centuries, and is particularly useful for bow hunting, where the effective range is generally less than that for rifle hunting. Reaching the elevated position in the tree, however, presents obvious difficulties to the hunter. First, the hunter must bring his weapon and accessory tools in the ascent, a task complicated by the need to use all four limbs in successfully climbing the tree. Second, once in place on the tree trunk, the hunter must remain still and quiet for extended periods, sometimes for hours at a time. To address these needs numerous tree seats, tree stands, and ascenders have been developed for hunters. Yet the hunter's needs are broader than the lineman's or the steeplejack's, as hunting will often take place at a distance from public roads, placing demands on the compactness and weight of the device. Furthermore, because the tree seat will be used through hours of stealth, the seat should restrain the hunter even through periods of intermittent slumber.

What is needed is a lightweight and compact tree seat which also assists a hunter in ascending a tree, while at the same time serving as a restraint against unintended descent.

SUMMARY OF THE INVENTION

The tree seat harness ascender of this invention has a collapsible seat assembly from the four corners of which extend adjustable upper straps which terminate at a central O-ring. A groin strap extends from the central ring to a portion of the seat assembly. A tree ascender strap is also connected to the central ring, and has a latchable hook which can be used to encircle the trunk of a tree and secure the climber as he climbs. A back strap and shoulder strap extend from the central ring and help to restrain a hunter within the assembly both while climbing and while in position. A main lead securing strap extends from an extension strap connected to the central ring and has a buckle which allows it to be secured around a tree above the head of the hunter. The main lead securing strap is looped through itself in such a way that the strap chokes the tree trunk within itself to prevent slipping on trees with smooth bark. In a preferred embodiment the seat assembly has two identical seat segments which are hinged to a rigid downwardly extending spar, with a plurality of straps in tension serving to keep the seat assembly in its erected condition when in use. Alternatively, collapsible seat assemblies employing flexible strap webs may be used.

It is an object of the present invention to provide a tree seat which will comfortably support a hunter in a tree for extended periods of time.

It is another object of the present invention to provide a tree seat with attachments which assist a hunter in ascending a tree.

It is a further object of the present invention to provide a tree seat which may be compactly stored.

It is an additional object of the present invention to provide a tree seat which has a unified attachment ring for the seat and the ascender straps.

It is also an object of the present invention to provide a hunter's tree seat which permits maximum movement while secured in an elevated position.

It is additionally an object of the present invention to provide a tree seat which permits substantially silent operation when occupied by a hunter.

Further objects, features and advantages of the invention will be apparent from the following detailed description when taken in conjunction with the accompanying drawings.

BRIEF DESCRIPTION OF THE DRAWINGS

FIG. 8 is a perspective view of an alternative embodiment seat assembly for the apparatus of this invention.

FIG. 9 is a perspective view of another alternative embodiment seat assembly for the apparatus of this invention.

FIG. 10 is a perspective view of yet another alternative embodiment seat assembly for the apparatus of this invention.

FIG. 11 is a perspective view of another alternative embodiment seat assembly for the apparatus of this invention having a snap-a lock truss assembly.

FIG. 12 is a perspective view of a further alternative embodiment seat assembly for the apparatus of this invention, having a hinged truss with a wing-nut fastener.

DESCRIPTION OF THE PREFERRED EMBODIMENTS

Figure 1:
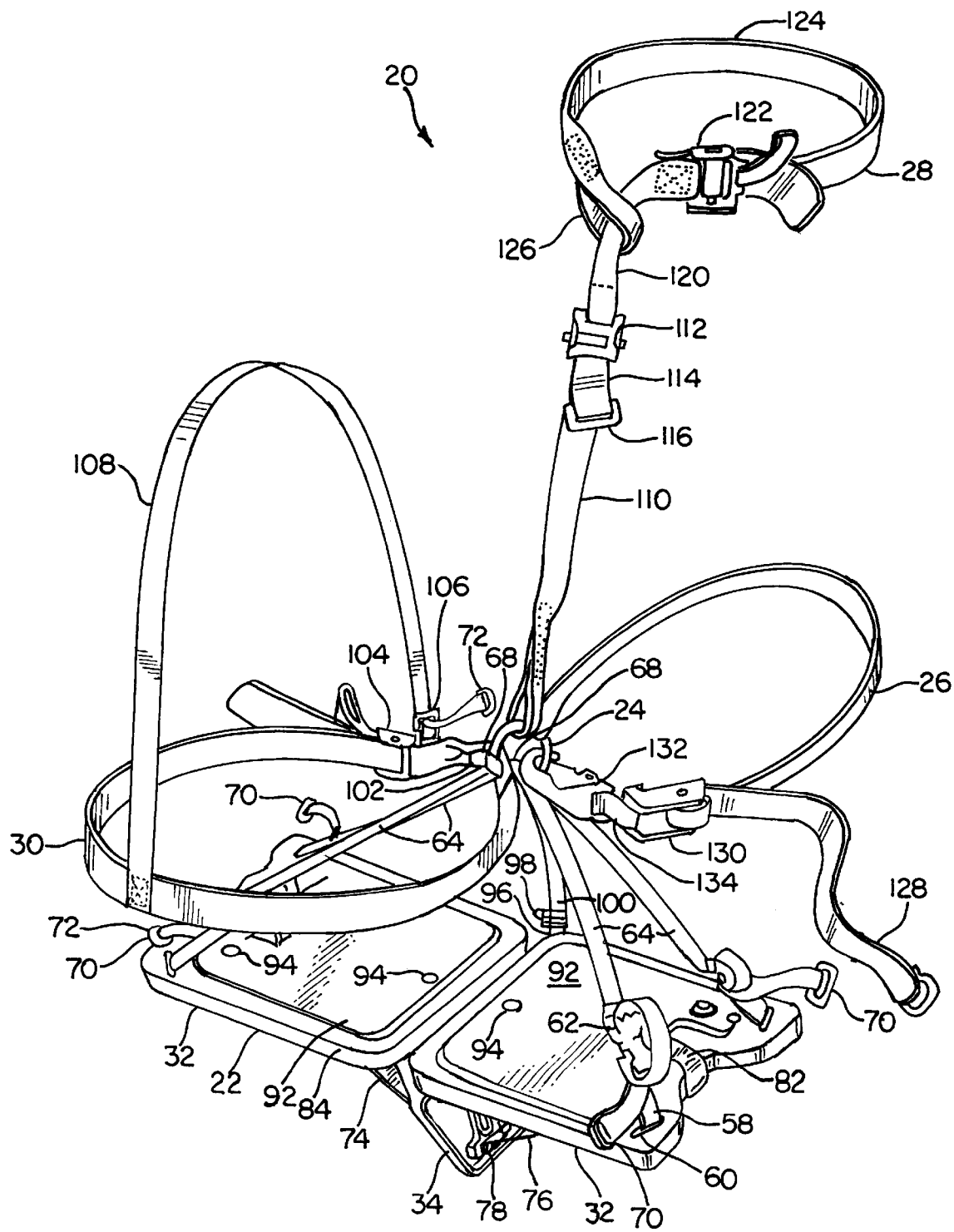
FIG. 1 is a rear perspective view of the tree seat and ascender of this invention deployed as if occupied by a hunter, but with the hunter not shown for clarity.

Referring more particularly to FIGS. 1–12, wherein like numbers refer to similar parts, a tree seat harness and ascender 20 is shown in FIG. 1. The apparatus 20 is composed of a seat assembly 22 which is connected by straps to a central welded metal O-ring 24 which provides a common attachment point for a climbing strap 26, a main lead securing strap 28, and a back strap 30. The apparatus 20 combines several functions in a single device, serving as a tree seat or tree stand, while at the same time providing a safety belt and tree climbing aid.

Figure 2:
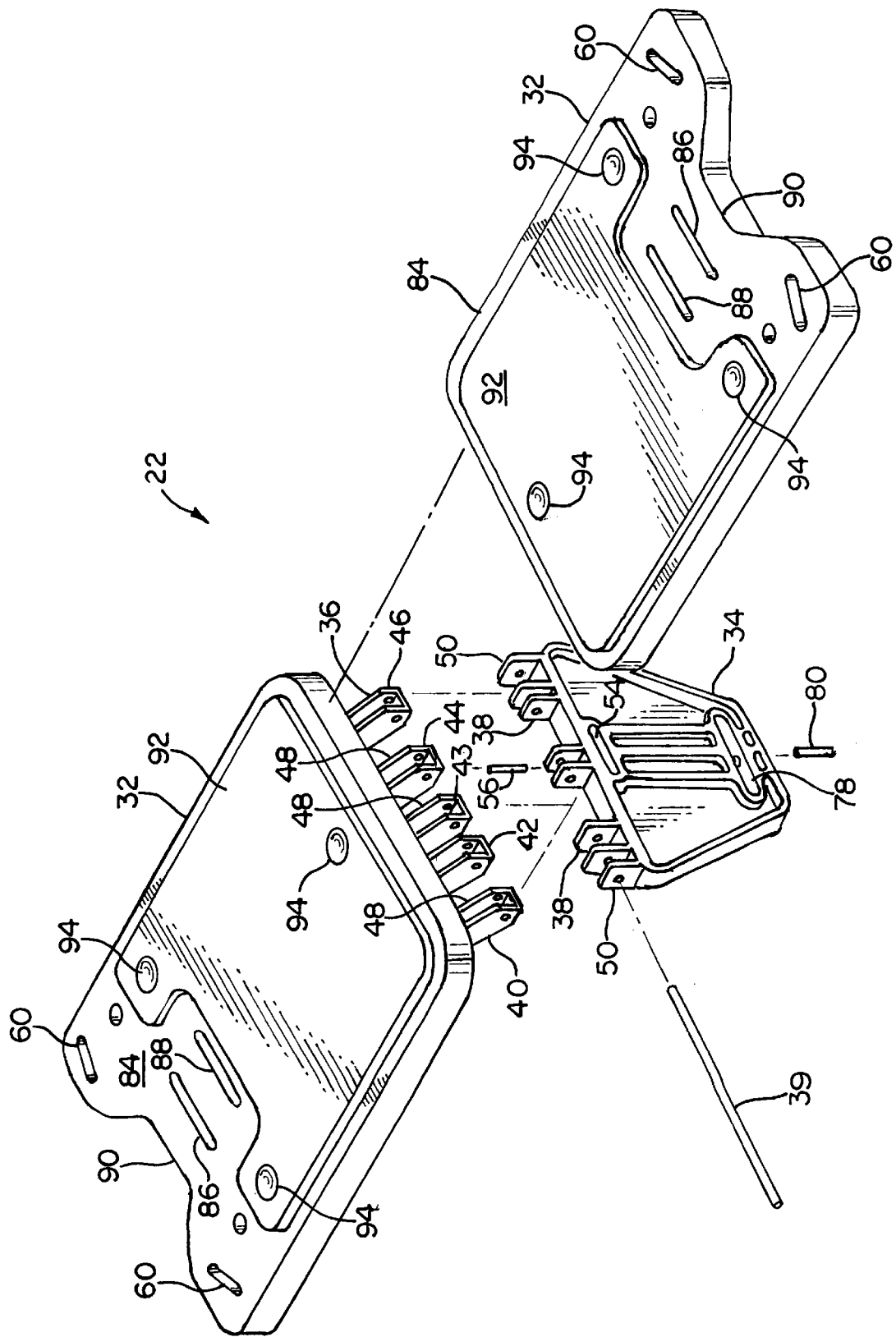
FIG. 2 is an exploded isometric view of the seat assembly of the apparatus of FIG. 1.
Figure 3:
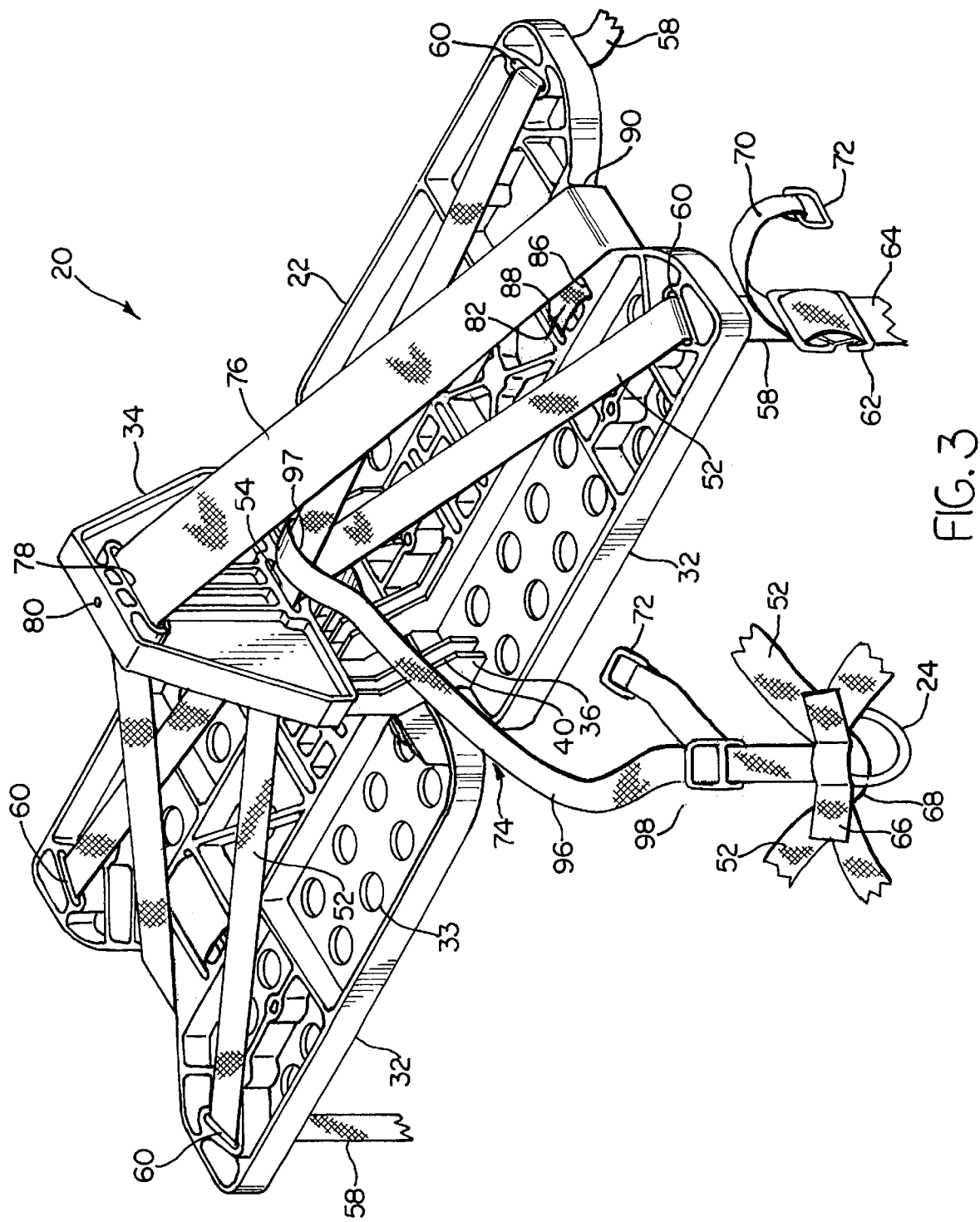
FIG. 3 is a fragmentary bottom front view of the apparatus of FIG. 1.
Figure 4:
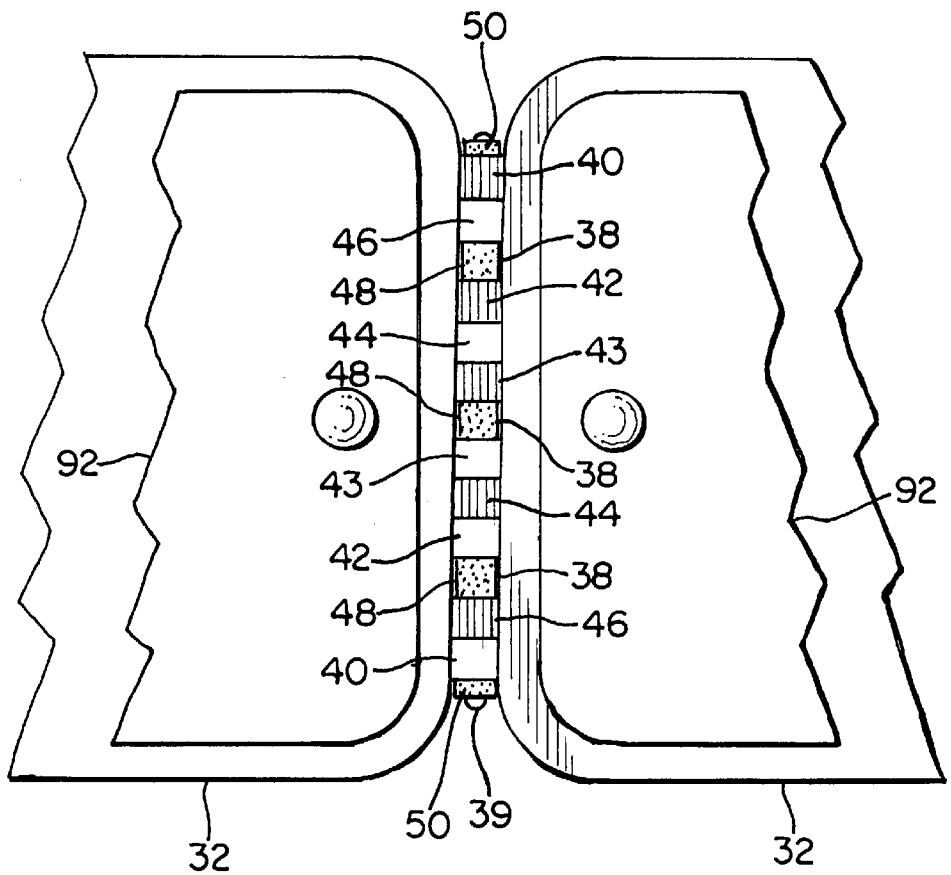
FIG. 4 is a fragmentary top plan view of the hinged seat assembly of the apparatus of FIG. 1.

Because hunters must often hike some distance to the hunting site, it is very desirable that any hunting accessories be lightweight and compact, so they may be conveniently carried. To permit compact storage, the seat assembly 22 is comprised of two rigid seat segments 32, which are hinged to a single rigid spar 34. Each seat segment 32 is preferably formed of injection molded plastic, and, as shown in FIG. 2, has a series of protruding knuckles 36 which are pinned to the knuckles of an identical seat segment 32 and the upwardly extending knuckles 38 of the spar 34 by a hinge pin 39. The seat segments may be formed with an array of relief holes 33 as shown in FIG. 3 for reduced weight. So the same injection molded part may be used for both segments, the knuckles on the segments 32 are preferably formed in the sequence shown in FIG. 4. Starting from one side of the knuckle sequence, there is a first knuckle 40, followed by a space for two knuckles of equal width, then a second knuckle 42, then a space for a single knuckle, then a third knuckle 43, followed by a space for two knuckles, then a fourth knuckle 44, followed by a space for two knuckles, and finally a fifth knuckle 46. When the two like seat segments 32 are assembled with the knuckles interdigitating, three evenly spaced openings 48 are defined in the double width spaces between knuckles. The three knuckles 38 of the spar extend into the openings 48 and the pin 39 extends through the connected seat segment and spar knuckles and the spar end tabs 50 to connect the three parts in a hinged assembly.

As best shown in FIG. 3, the seat assembly 22 uses the tension which will be applied to the fabric straps of the apparatus when it is supported on a tree to retain the two seat segments 32 in an open configuration. Two seat cross straps 52 extend beneath the seat segments 32 and cross one another where they pass through an upper slot 54 in the spar 34. The crossed cross straps 52 are fixed to the spar 34 by a metal pin 56 which extends downwardly into and through the upper slot 54. The four ends 58 of the two cross straps 54 pass through the seat segments 32 at seat corner slots 60 located at the outer corners of the seat assembly 22. As shown in FIG. 1, each cross strap end 58 is looped back and stitched on itself to enclose a spring loaded lever buckle 62 which is positioned above a seat segment. Each buckle 62 is larger than the corner slot, and therefore prevents the cross strap end from being retracted beneath the seat segment. As shown in FIG. 1, two upper straps 64 cross one another and are stitched to one another and to the ends of a short covering strap 66, as shown in FIG. 3, to form a loop 68 into which the ring 24 is inserted. The loop 68 restricts tilting of the seat segments with respect to the ring 24, by positioning the center of the connected upper straps in a fixed position. The upper straps 64 terminate in four ends 70, each of which passes through and is engaged by one of the buckles 62. Thus strap segments are defined as portions of the upper straps 64 between each 70 and the ring 24. Each upper strap end 70 is preferably looped back on itself and stitched around a link 72 which has an opening large enough for the wearer to grasp to make tightening of the straps 64 easier. The links 72 are preferably metal, and similar links are provided on the ends of the shoulder strap 108, the groin strap 96, and the climbing strap 26. The metal links serve as a safety backup to possible inadvertent release of a buckle. Even if the buckle should fail to clasp a strap, the links are large enough that they prevent the end of the strap from escaping from the buckle.

When the wearer of the apparatus 20 is supported in an elevated position on a tree, as discussed in more detail below, the upper straps 64 and the connected cross straps 52 will be in tension, tending to collapse the seat upwardly. At the same time, the weight of the wearer will be disposed downwardly on the seat, again placing loads on the joint or hinge 74 defined where the seat segment and spar knuckles are connected. To counteract these forces and provide a stable surface for supporting the wearer, a truss strap 76, best shown in FIG. 3, extends from one seat segment 32, through a lower slot 78 in the spar to the other seat segment 32. The truss strap 76 is fixed to the spar 34 by a pin 80 which extends into and through the lower slot 78. Each end 82 of the truss strap 76 is screwed or riveted to a seat segment 32, and passes over the top surface 84 of the seat segment and down through an outer slot 86, along the underside of the seat segment for about an inch, and then up through an inner slot 88 and back over the top surface of the segment, over the outer edge 90 of the seat segment and then to the spar 34. The truss strap 76 provides substantially no resistance to collapsing the seat when the hunter is on the ground and no weight is carried by the upper straps 64. However, when loads are supported on the upper straps 64, the truss strap 76 will be placed in tension, and the tight truss strap will exert an upward force on the spar 34 which will counteract the downward force of the occupant of the seat assembly 22.

For the comfort of the seat occupant, each seat segment 32 is preferably covered by a closed cell foam cushion 92, shown in FIG. 1, which may be held in place with snap plastic fasteners 94 or rivets.

Figure 7:
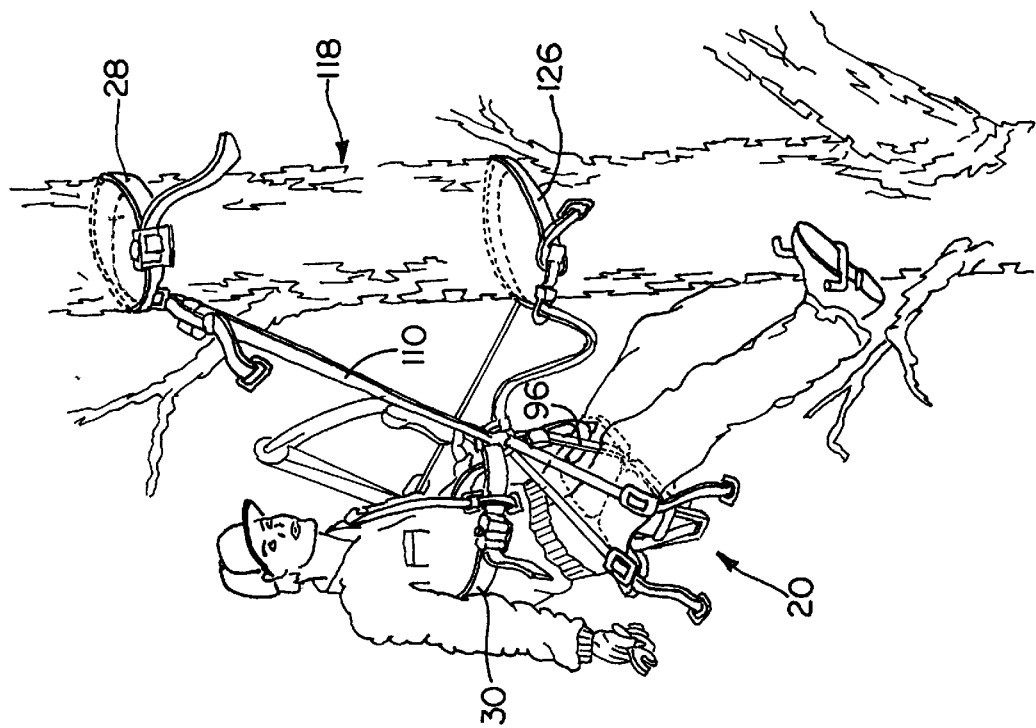
FIG. 7 is a perspective view of the hunter of FIG. 5 in an elevated position supported on the tree seat of the apparatus of FIG. 1.

As shown in FIG. 7, the upper straps 64 will pass on either side of the wearer's hips. To restrain the occupant from sliding forward out of the apparatus 20, a groin strap 96 extends from a point beneath the seat segments 32 to the center ring 24. The groin strap 96 has a lower loop 97, shown in FIG. 3, through which the cross straps 52 extend. The groin strap 96 extends for a position to one side of the spar beneath the seat segments to a bar buckle 98 that is in turn connected by a linking strap 100 to the covering strap 66 of the loop 68 and thus linked to the central ring 24. By pulling on the groin strap 96 the length of the combined groin strap 96 and linking strap 100 may be adjusted, and the fit of the apparatus may be adjusted to suit a particular occupant.

As shown in FIG. 1, the broad back strap 30, preferably about two inches wide, is connected to the central ring 24 by being folded over on itself for about a two-and-a-half inch section, and sewn to itself and to a covering strap 102 which defines a loop which receives the ring. A first end of the back strap 30 is terminated by a sliding or floating bar buckle 104, while the other end of the back strap extends around the wearer and is received within the buckle 104. A cam buckle 106 is sewn on a loop of strap immediately adjacent to the back strap buckle 104, and projecting perpendicular to the back strap. The cam buckle 106 adjustably receives a shoulder strap 108, preferably about one inch in width, which extends over the wearer's shoulder and is sewn in place at a midpoint on the back strap 30. The back and shoulder straps 30, 108, together with the groin and upper straps 96, 64, retain the wearer to the seat assembly 22. The remaining two attachments to the central ring 24 serve to support the seat assembly 22 and the occupant on a tree 118.

It should be noted that, although the stiff seat assembly 22 is conducive to the comfort of the occupant, should the spar, the seat segments, or the hinges give way, the connection of the straps of the apparatus 20 will still serve to restrain the occupant within the apparatus. Without the seat segments, the cross straps 52 will serve as an underlying seating surface.

The main lead extension 110 is preferably a two-inch wide strap which is folded in half and then looped over itself for about a six-inch segment, to form a one inch wide strip of strapping with a loop to receive the center ring 24. The main lead extension 110 terminates in a floating bar buckle 112 through which the end 114 of the main lead extension extends. The end 114 of the main lead extension 110 is preferably terminated in a link 116 retained within a loop of strap to facilitate grasping of the end 114. The main lead extension 110 extends upwardly from the seat assembly occupant to the tree positioned in front of the occupant. The main lead securing strap 28 is also preferably a two-inch wide strap which is looped and sewn to the buckle 112 on the end of the main lead extension 110. The main lead securing strap 28 is of sufficient length to encircle the tree 118 which the user intends to climb, preferably accommodating trees up to 24 inches in circumference.

The main lead securing strap 28 must be adjustable to snugly engage trees of various size, and therefore it is composed of two segments. The main lead securing strap 28 has a connecting segment 120 which is folded over and sewn to itself between the position where the connecting segment is looped and sewn to the main lead extension buckle 112 and where it is looped and sewn to a securing strap floating bar buckle 122. The second segment 124 of the main lead securing strap 28 has one end which is adjustably engaged within the securing strap buckle 122, and another end which terminates in a wide loop 126, preferably about two inches long, as shown in FIG. 1. The main lead securing strap 28 is folded over and sewn to itself so that the strap is about one inch wide and of double thickness as it is formed into the loop 126. The connecting segment 120 passes through the loop 126, such that the downward loads exerted by the occupant on the main lead extension 110 pull the main lead securing strap 28 tight about the tree 118, serving to choke the tree and prevent slippage of the strap with respect to the tree bark. This feature is particularly advantageous when climbing trees with smooth bark such as Birch or Poplar.

The final attachment to the center ring 24 is the climbing strap 26. The end of the climbing strap 26 is folded over and sewn to itself to define a loop into which the ring 24 is inserted. It may be noted here that the climbing strap 26, as well as all the other straps and strap assemblies which are attached to the center ring 24, are attached in such a manner to permit the straps to slide around the ring to accommodate different positions of the straps and the occupant. The climbing strap 26 may be about one inch wide, and terminates in an end 128 which is received within a cam buckle 130. A spring closable hook 132 is connected to the climbing strap buckle 130 by a short strap 134. The hook 132 is sized to permit it to be selectably connected to the center ring 24. The climbing strap 26 may thus be disposed to encircle a tree and the hook 132 snapped onto the center ring 24 repeatedly as the user ascends a tree. The climbing strap 26 provides a backup and safety to the climber going up a tree, while not being excessively cumbersome to deploy and reposition.

Figure 5:
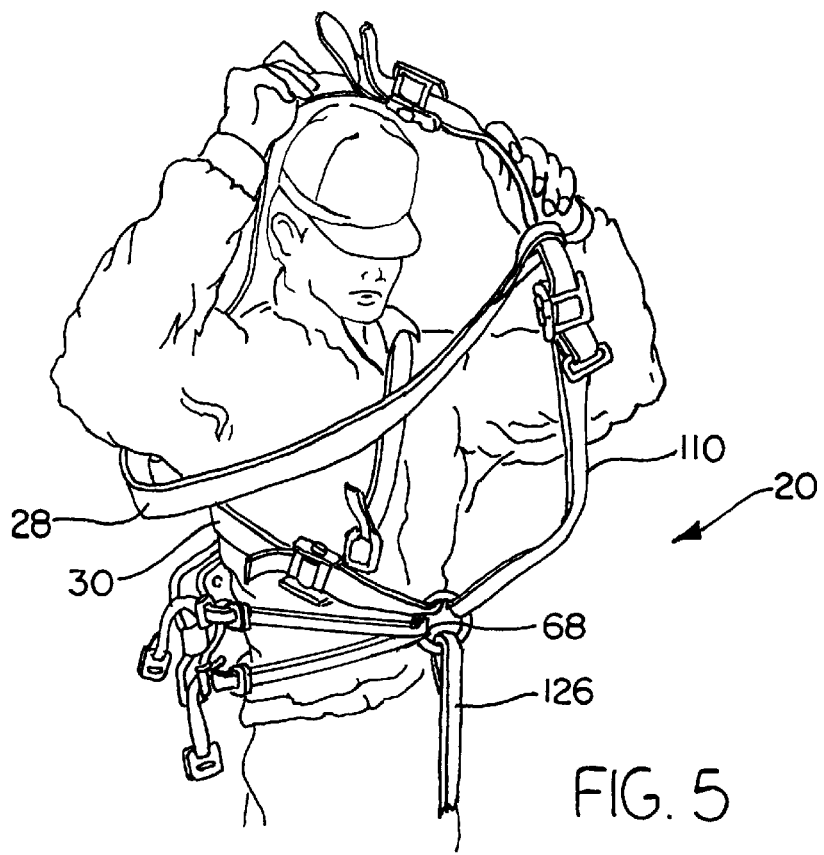
FIG. 5 is a perspective view of a hunter donning the apparatus of FIG. 1.
Figure 6:
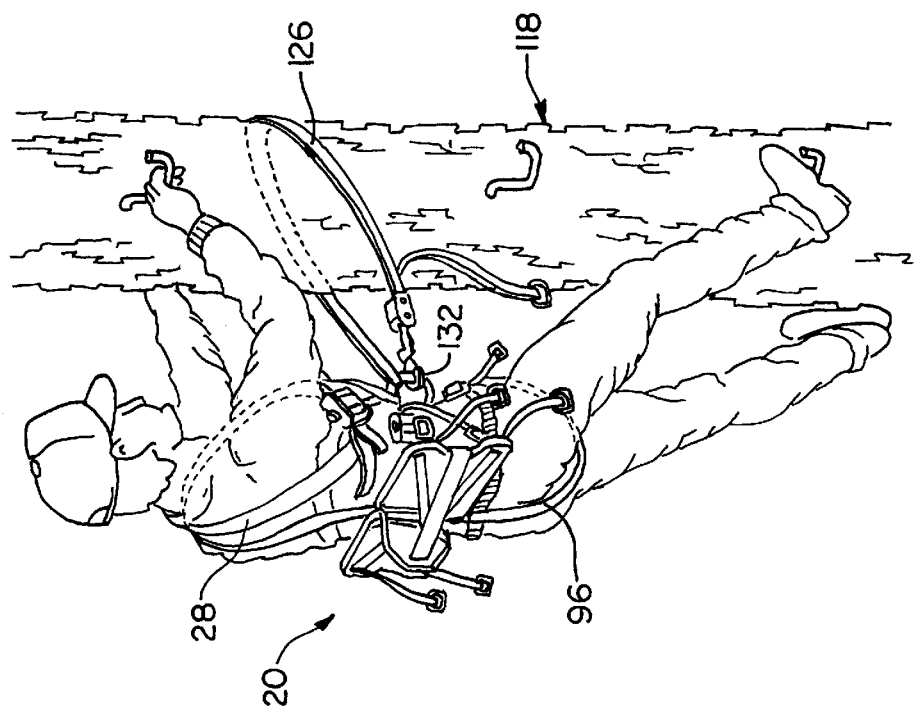
FIG. 6 is a perspective view of the hunter of FIG. 5 outfitted in the apparatus of FIG. 1 and ascending a tree.

The donning and operation of the apparatus 20 is illustrated in FIGS. 5–7. When the hunter locates a suitable tree in which to establish a hunting position, the apparatus 20, still in a compact, collapsed configuration, is removed from the hunter's day pack and held out in front of the hunter with the two adjacent seat segments 32 extending upwardly, with the hinge facing downward. While holding the seat assembly 22 in one hand, the strapping is unwound and allowed to drape downwardly. The seat segments 32 are pivoted downwardly about the hinge so the seat cushions 92 face toward the ground. Still holding the inverted seat assembly 22, the hunter grasps all the straps just below the central O-ring 24. Still holding the straps and the ring 24 in one hand, the hunter bends over and steps into the upper straps 64 and over the extended seat assembly 22. The hunter dons the apparatus 20 like a pair of overalls, with one foot passing over the seat assembly 22 on either side of the groin strap 96.

Holding the center ring 24 in one hand, and the seat assembly 22 in the other, the hunter slides the seat assembly 22 up to the middle of his back. Passing the center ring 24 from one hand to the other as necessary, the hunter uses his free hand to pull on each of the ends 70 of the upper straps 64 in turn to remove the slack from the upper straps and secure the seat assembly 22 to the hunter's back for climbing.

With the seat assembly 22 secured in climbing position, the hunter grasps the back strap 30 with his right hand and stretches it to its full length above his head. The hunter grasps the shoulder strap 108 at a positions midway between the buckle 106 and the back strap 30 and then brings the shoulder strap over his left shoulder. At this point the back strap is dangling behind the hunter's back, where it is grasped and brought around and passed through the sliding bar buckle 104 at the center ring 24. For improved back support the back strap 30 is preferably positioned high in the middle of the hunter's back. The location of the back strap 30 is adjusted by pulling on the shoulder strap 108 until the back strap is in the desired location, and then removing any slack in the shoulder strap by adjusting the cam buckle 106.

To keep the main lead securing strap 28 out of the way when climbing the tree, it is preferably laced through the sliding bar buckle 122 to form a loop on the end of the main lead extension strap 110. As shown in FIG. 5, the hunter may then extend one arm and his head through the loop until such time as it is necessary to engage the main lead securing strap around the tree.

Once the hunter has put on the apparatus 20, he may proceed to climb a tree 118. As the hunter ascends the tree, the snap hook 132 on the climbing strap 26 is passed around the tree trunk and snapped onto the center ring 24. Slack may be removed from the climbing strap 26 by pulling on the end 128 as it extends from the cam buckle 130. The hunter is then positioned on the tree in a standing position leaning back slightly away from the tree. In this position the hunter has both hands free for pruning interfering branches and installing any necessary tree steps to assist in climbing higher up the tree. If the hunter encounters a large limb which is to be left undisturbed, and over which the looped climbing strap cannot be moved, the apparatus 20 allows the hunter to bypass the limb while continuing to be securely attached to the tree. The hunter removes the main lead strap 28 from over his head, opens the looped main lead strap, and encircles the tree trunk above the level of the obstructing branch, and only then unclips the tree climbing strap 26.

Only once the tree climbing strap 26 has been connected to the tree trunk above the level of the branch, is the main lead strap 28 released from the tree. In this fashion the hunter progresses up the tree until he reaches his desired final elevation. At the final elevation, slack is removed from the tree climbing strap 26, and the main lead securing strap 28 is looped around the tree at a level approximately six inches above the hunter's head. The end of the main lead securing strap 28 is passed through the floating bar buckle 122.

Once secured by the main lead securing strap 28, the climbing strap 26 may be loosened. However, the climbing strap 26 should remain attached to the tree to serve as an additional safety strap. The hunter may then adjust the upper straps 70 at the lever buckles 62 until he is seated comfortably on the seat assembly 22, as shown in FIG. 7. The main lead extension 110 may be adjusted in length to comfortably position the hunter on tree pegs or limbs, while preserving the maximum maneuverability of the hunter around the tree. By applying a small amount of foot pressure to the tree trunk, the hunter may rotate up 180 degrees around the tree in silence, allowing the hunter to use the tree as a blind.

It should be noted that the apparatus 20 advantageously secures the hunter to the tree trunk while climbing and descending. In addition, it may easily be fabricated to fit trees up to 24 inches in diameter. The apparatus 20 will not harm the tree which is climbed, and it is lightweight, compact, and portable. In addition, the apparatus is extremely quiet and gives a wide angle of approach for the hunter, and may be used by bow or firearm hunters. Because of the adjustability of the various straps, a single unit is readily adapted for use by men, women, or children.

Examples of slide or floating bar buckles may be found at http://www.acw.thomasregister.com/olc/acw/hard.htm, part no. 137.

It should be noted that the seat assembly for the tree seat harness and ascender of this invention may be constructed according to a variety of collapsible structures. Five alternative embodiment seat assemblies are shown in FIGS. 8–12. The alternative embodiment seat assembly 136, shown in FIG. 8, has two U-shaped tubular steel seat segments 138 which open toward one another and which have legs 142 which slide in open-ended tubular channels 140 which are fixed beneath a rigid seat board 144. Spring loaded detents, not shown, are connected to the ends of each leg 142. The detents extend into holes 146 in the tubular channels 140 when the seat segments are pulled apart. The seat assembly 136 is illustrated in connection with two upper straps, as are the embodiments of FIGS. 9–12, however, it should be understood that the seat assemblies form a part of a tree seat harness and ascender with back and shoulder straps, main lead securing strap, and climbing strap as discussed above.

Another alternative embodiment seat assembly 148 of this invention is shown in FIG. 9. The seat assembly 148 has two seat segments 150 which are comprised of rigid top boards 152 which are connected to two parallel legs. The legs 154 of a first segment 155 are square tubular steel segments which are pin connected to the legs 156 of a second segment 158. The second segment legs 156 are downwardly opening C-channels. The first segment legs 154 fit with the ends of the channel openings of the second segment legs 156 when the first segment is pivoted about the pivot points on the second segment 158. It will be observed that when a downward force is applied to the top boards 152, the composite seat assembly will remain horizontal. However, on the ground, when an upward force is applied at the pivot point, the two seat segments may be rotated to lie adjacent one another.

It should be noted that the seating surface of the seat assemblies of this invention need not be rigid. As shown in FIGS. 10–12, the seating surface may also be formed of a flexible material, such as a web formed of straps. The seat assembly 236, shown in FIG. 10, has two T-shaped seat segments 238, each of which has an upper member 240, to which the upper straps 242 are attached, and a downwardly extending truss member 244. A seating web 246 extends between the two upper members 240. One of the truss members 244 is terminated in a square plate 248, while the other is terminated in an upwardly facing slotted member 250 which slidably receives the square plate 248 when it is pressed down into the slot 252. This assembly 236 again can be easily separated by pressing upwardly on the two segments, but cannot be separated by the downward loads which will be imposed by a supported hunter.

The seat assembly 254 shown in FIG. 12 is similar to the seat assembly 236, in that it has two T-shaped seat segments 256 which have upper members 258 which are connected by a web 260 of straps, and which have downwardly extending truss members 262. The truss members 262 are each connected to one of the plates 264 of a pivoting hinge 266. The seat assembly 254 may be maintained in an erected position by wing nut and bolt assemblies 268 which engage between holes on one of the plates 264, and downwardly opening slots 270 on the other of the plates.

The seat assembly 272, shown in FIG. 11, has two U-shaped tubular steel seat segments 274. Each seat segment 274 has an upper member 276 to which the upper straps are connected and between which a strap web 278 extends. Two legs 280 extend downwardly and inwardly from each upper member 276. One set of legs 280 terminates in depressible detents 282, while the other set of legs 280 terminates in square tubular openings 284 having side holes 286. The openings 284 receive the legs 280 and the detents then extend into the side holes 286 to positively lock the seat assembly 272 into an extended configuration.

Furthermore, although particular buckles, clasps, and latches have been disclosed, other appropriate fasteners for the straps or webbing may be employed. The slide bar buckles, cam buckles, spring buckles, and other buckles into which an end of a strap is insertable to adjust the total length of a strap all provide a means for adjusting the length of the strap. The straps may be made of any sufficiently strong material, for example UV-resistant polyester.

It is understood that the invention is not limited to the particular construction and arrangement of parts herein illustrated and described, but embraces such modified forms thereof as come within the scope of the following claims.

I claim:

1. An apparatus for supporting a hunter in an elevated position in a tree, the apparatus comprising:

a seat having four corners, and having a downwardly extending spar hinged to the seat, wherein a truss strap extends from the seat beneath portions of the spar to support loads disposed on the seat, and wherein the spar has a lower slot beneath the seat, and wherein the truss strap extends through the lower slot;

a central ring positioned above the seat assembly;

four upper strap segments which extend from the four corners of the seat assembly to the central ring to support the seat assembly from the ring, each upper strap segment being fixed to the central ring, and being adjustable in length, to adjust the distance from the central ring to each of the four corners;

a back strap which is connected to the central ring, the back strap having a free end which is adjustably engaged with a back strap fastener attached to the back strap, such that the encircling length of the strap is adjustable to surround and engage the supported hunter;

a shoulder strap which is fixed to the back strap and which extends generally perpendicularly to the back strap between two spaced positions along the back strap, the shoulder strap being positioned to extend over the hunter's shoulder;

a main securing strap which has a first end which is connected to the central ring, and a second end which forms a loop which is releasable to encircle a tree and engage the tree to support the ring and the supported seat assembly on the tree.

2. The apparatus of claim 1 wherein the seat comprises:

a first seat segment;

a second seat segment hingedly connected to the first seat segment; and wherein the downwardly extending spar is hinged to the first seat segment and the second seat segment, wherein the truss strap extends from the first seat segment, beneath portions of the spar and to the second seat segment to support loads disposed on the seat assembly, the first seat segment being pivotable with respect to the second seat segment so that the seat assembly may be collapsed.

3. The apparatus of claim 2 wherein the first segment has an array of knuckles which protrudes toward an identical array of knuckles on the second segment, the knuckles being spaced from one another to define a plurality of gaps into which a plurality of knuckles extend upwardly from the spar, and wherein a pin extends through the adjacent knuckles to pivotably connect the spar to the first seat segment and the second seat segment.

4. The apparatus of claim 1 further comprising a groin strap which extends from the center ring to a position fixed beneath the seat.

5. The apparatus of claim 1 wherein the upper straps have adjustable buckles near the seat corners where the upper strap segments are connected to the seat assembly to permit the leveling of the seat assembly when occupied by a hunter.

6. An apparatus for supporting a hunter in an elevated position in a tree, the apparatus comprising:

a collapsible seat assembly having four corners, the seat assembly comprising a first seat segment, a second seat segment hingedly connected to the first seat segment, and a downwardly extending spar which is hinged to the first seat segment and the second seat segment, wherein a truss strap extends from the first seat segment, beneath portions of the spar and to the second seat segment to support loads disposed on the seat assembly, the first seat segment being pivotable with respect to the second seat segment so that the seat assembly may be collapsed, wherein the spar has a lower slot beneath the seat segments, and wherein the truss strap extends through the lower slot;

a central ring positioned above the seat assembly;

upper straps which extend from the four corners of the seat assembly to the central ring to support the seat assembly from the ring;

a back strap which is connected to the central ring, the back strap having a free end which is adjustable engaged with a back strap fastener attached to the back strap, such that the encircling length of the strap is adjustable to surround and engage the supported hunter;

a shoulder strap which is fixed to the back strap and which extends generally perpendicularly to the back strap between two spaced positions along the back strap, the shoulder strap being positioned to extend over the hunter's shoulder;

a main securing strap which has a first end which is connected to the central ring, and a second end which forms a loop which is releasable to encircle a tree and engage the tree to support the ring and the supported seat assembly on the tree; and a climbing strap which has a first end which is connected to the central ring, and a second end which is terminated by a hook which is releasably connected to the central ring, the climbing strap having a buckle through which the strap extends such that the length of the climbing strap may be adjusted.

7. An apparatus for supporting a hunter in an elevated position in a tree, the apparatus comprising:

a collapsible seat assembly having four corners, the seat assembly comprising a first seat segment, a second seat segment hingedly connected to the first seat segment, and a downwardly extending spar which is hinged to the first seat segment and the second seat segment, wherein a truss strap extends from the first seat segment, beneath portions of the spar and to the second seat segment to support loads disposed on the seat assembly, the first seat segment being pivotable with respect to the second seat segment so that the seat assembly may be collapsed, wherein the spar has an upper slot positioned beneath the seat segments, and wherein two cross straps extend beneath the seat segments and through the upper slot, each cross strap having two ends which extend through corner slots in the scat segments and which are connected to the upper straps;

a central ring positioned above the seat assembly;

upper straps which extend from the four corners of the seat assembly to the central ring to support the seat assembly from the ring;

a back strap which is connected to the central ring, the back strap having a free end which is adjustably engaged with a back strap fastener attached to the back strap, such that the encircling length of the strap is adjustable to surround and engage the supported hunter;

a shoulder strap which is fixed to the back strap and which extends generally perpendicularly to the back strap between two spaced positions along the back strap, the shoulder strap being positioned to extend over the hunter's shoulder;

a main securing strap which has a first end which is connected to the central ring, and a second end which forms a loop which is releasable to encircle a tree and engage the tree to support the ring and the supported seat assembly on the tree; and a climbing strap which has a first end which is connected to the central ring, and a second end which is terminated by a hook which is releasably connected to the central ring, the climbing strap having a buckle through which the strap extends such that the length of the climbing strap may be adjusted.

8. The apparatus of claim 7 further comprising a pin which extends through the two cross straps within the upper slot to fix the cross straps to the spar.

9. The apparatus of claim 7 further comprising a groin strap which extends from the center ring to a position beneath the seat segments, the groin strap terminating in a loop through which the cross straps extend.

10. An apparatus for supporting a hunter in an elevated position in a tree, the apparatus comprising:

a collapsible seat assembly having four corners;

a central ring positioned above the seat assembly;

upper straps which extend from the four corners of the seat assembly to the central ring to support the seat assembly from the ring;

a back strap which is connected to the central ring, the back strap having a free end which is adjustably engaged with a back strap fastener attached to the back strap, such that the encircling length of the strap is adjustable to surround and engage the supported hunter;

a shoulder strap which is fixed to the back strap and which extends generally perpendicularly to the back strap between two spaced positions along the back strap, the shoulder strap being positioned to extend over the hunter's shoulder;

a main securing strap which has a first end which is connected to the central ring, and a second end which forms a loop which is releasable to encircle a tree and engage the tree to support the ring and the supported seat assembly on the tree; and a climbing strap which has a first end which is connected to the central ring, and a second end which is terminated by a hook which is releasably connected to the central ring, the climbing strap having a buckle through which the strap extends such that the length of the climbing strap may be adjusted, wherein the main securing strap comprises:
- a first segment which is terminated by an upper buckle; and
- a second segment of strap which is formed into a loop at a first end and which extends into and is adjustably received within the first segment upper buckle at a second end, wherein the first segment extends through the second segment loop, such that when the main securing strap encircles a tree the first segment is slidably disposed within the loop such that downward force on the first segment causes the main securing strap to be tightened around the tree.

11. A tree climbing and hunter supporting apparatus comprising:

a seat assembly having four corners, and having a downwardly extending spar hinged to the seat assembly, wherein a truss strap extends from the seat assembly beneath portions of the spar to support loads disposed on the seat, and wherein the spar has a lower slot beneath the seat, and wherein the truss strap extends through the lower slot;

a central ring positioned above the seat assembly;

four upper strap segments each having an end which extends from one of the seat assembly corners, wherein the four upper strap segments are fixedly connected to the central ring, and wherein the upper strap segments are adjustable in length to control the distance between the central ring and each of the seat assembly corners;

a securing strap which extends upwardly from the central ring, the securing strap being capable of encircling a tree and releasably fastened to itself to form a loop which supports the central ring and the supported seat assembly from the tree;

a climbing strap which extends from the central ring, the climbing strap terminating in a hook and being of adjustable length, such that the climbing strap is capable of encircling a tree such that the hook engages the central ring to secure a hunter to a tree while ascending the tree;

a back strap which extends from the central ring and which can be looped about a hunter whose legs extend between the upper straps and the seat assembly, the back strap releasably forming an encircling loop around the hunter to restrain the hunter with respect to the central ring and the seat assembly; and a shoulder strap which is connected to the back strap at two positions which are spaced in front and behind a hunter encircled by the back strap.

12. The apparatus of claim 11 further comprising two cross straps which extend beneath the seat assembly, and wherein each cross strap has two ends, one of which is connected to one end of an upper strap at a buckle which permits length adjustment of the combined upper strap and cross strap length.

13. The apparatus of claim 12 wherein the seat assembly comprises:

a first seat segment;

a second seat segment pivotably connected to the first seat segment.

14. The apparatus of claim 12 further comprising a groin strap which extends from the central ring to the seat assembly at a position intermediate between two corners of the seat assembly, such that a hunter can extend one leg on either side of the groin strap such that each leg is positioned between the groin strap and one of the upper straps.

15. A tree climbing and hunter supporting apparatus comprising:

a seat assembly having four corners;

a central ring positioned above the seat assembly;

two upper straps each having an end which extends from one of the seat assembly corners,
- wherein the two upper straps are connected to the central ring, and wherein the upper straps are adjustable in length to control the distance between the central ring and each of the seat assembly corners;

two cross straps which extend beneath the seat assembly, and wherein each cross strap has two ends, one of which is connected to one end of an upper strap at a buckle which permits length adjustment of the combined upper strap and cross strap length;

a securing strap which extends upwardly from the central ring, the securing strap being capable of encircling a tree and releasably fastened to itself to form a loop which supports the central ring and the supported seat assembly from the tree;

a climbing strap which extends from the central ring, the climbing strap terminating in a hook and being of adjustable length, such that the climbing strap is capable of encircling a tree such that the hook engages the central ring to secure a hunter to a tree while ascending the tree;

a back strap which extends from the central ring and which can be looped about a hunter whose legs extend between the upper straps and the seat assembly, the back strap releasably forming an encircling loop around the hunter to restrain the hunter with respect to the central ring and the seat assembly; and a shoulder strap which is connected to the back strap at two positions which are spaced in front and behind a hunter encircled by the back strap;

a groin strap which extends from the central ring to the seat assembly at a position intermediate between two corners of the seat assembly, such that a hunter can extend one leg on either side of the groin strap such that each leg is positioned between the groin strap and one of the upper straps, wherein the groin strap terminates in a loop beneath the seat assembly, and wherein the cross straps pass through the groin strap loop.

16. A combination tree seat and tree ascender, comprising:

a seat assembly having four corners, and having a downwardly extending spar hinged to the seat assembly, wherein a truss strap extends from the seat assembly beneath portions of the spar to support loads disposed on the seat, and wherein the spar has a lower slot beneath the seat, and wherein the truss strap extends through the lower slot;

a central ring;

upper straps which are connected to the central ring, and which extend from the central ring to each of the four corners;

means for adjusting the length of the upper straps between the central ring and each of the four corners;

a back strap which extends from the central ring above the seat assembly and which is dimensioned to encircle a person sitting on the seat assembly;

means for adjusting the length of the back strap to secure the back strap around the person;

a main lead strap which extends upwardly from the central ring, the main lead strap having a means for adjusting the length of the main lead strap as it encircles a tree and connecting the strap to itself;

a climbing strap which is fastened to the central ring;

a hook attached to the climbing strap for releasable connection to the central ring to encircle a tree; and means for adjusting the length of climbing strap interposed between the hook and the portion of the climbing strap which is fastened to the central ring.

17. The apparatus of claim 16 further comprising a groin strap which extends from the central ring to the seat assembly at a position intermediate between two corners of the seat assembly, such that a person can extend one leg on either side of the groin strap such that each leg is positioned between the groin strap and one of the upper straps, the groin strap being connected to straps which extend between the upper straps at a position beneath the seat assembly.

18. A tree climbing and hunter supporting apparatus comprising:

a seat assembly having two seat segments which are pivotally connected together, each seat segment having portions defining two corners;

cross straps which extend beneath the seat assembly, the cross straps having ends which extend upwardly through slots in the seat segments at the corners;

a central ring positioned above the seat assembly;

four upper strap segments, each having an end which is connected to a cross strap end which extends from one of the seat assembly corner slots, wherein the four upper strap segments are fixed to the central ring, and wherein the upper strap segments are adjustable in length to control the distance between the central ring and each of the seat assembly corners, the upper strap segments having adjustable buckles where the upper strap segments are connected to the seat assembly;

a securing strap which extends upwardly from the central ring, the securing strap being capable of encircling a tree and releasably fastened to itself to form a loop which supports the central ring and the supported seat assembly from the tree; and a back strap which extends from the central ring and which can be looped about a hunter whose legs extend between the upper straps and the seat assembly, the back strap releasably forming an encircling loop around the hunter to restrain the hunter with respect to the central ring and the seat assembly.

19. The apparatus of claim 18 wherein the seat assembly comprises:

a first seat segment;

a second seat segment hingedly connected to the first seat segment; and a downwardly extending spar which is hinged to the first seat segment and the second seat segment, wherein a truss strap extends from the first seat segment, beneath portions of the spar and to the second seat segment to support loads disposed on the seat assembly.

20. The apparatus of claim 19 wherein the first segment has an array of knuckles which protrudes toward an identical array of knuckles on the second segment, the knuckles being spaced from one another to define a plurality of gaps into which a plurality of knuckles extend upwardly from the spar, and wherein a pin extends through the adjacent knuckles to pivotably connect the spar to the first seat segment and the second seat segment.

21. A tree climbing and hunter supporting apparatus comprising:

a seat assembly having two seat segments which are pivotally connected together, each seat segment having portions defining two corners;

cross straps which extend beneath the seat assembly, the cross straps having ends which extend upwardly through slots in the seat segments at the corners;

a central ring positioned above the seat assembly;

two upper straps each having an end which is connected to a cross strap end which extends from one of the seat assembly corner slots, wherein the two upper straps are connected to the central ring, and wherein the upper straps are adjustable in length to control the distance between the central ring and each of the seat assembly corners;

a securing strap which extends upwardly from the central ring, the securing strap being capable of encircling a tree and releasably fastened to itself to form a loop which supports the central ring and the supported seat assembly from the tree; and a back strap which extends from the central ring and which can be looped about a hunter whose legs extend between the upper straps and the seat assembly, the back strap releasably forming an encircling loop around the hunter to restrain the hunter with respect to the central ring and the seat assembly;

a groin strap which extends from the central ring to the seat assembly at a position intermediate between two corners of the seat assembly, such that a hunter can extend one leg on either side of the groin strap such that each leg is positioned between the groin strap and one of the upper straps, the groin strap terminating in a loop beneath the seat assembly, and wherein the cross straps pass through the groin strap loop.

22. A tree climbing and hunter supporting apparatus comprising:

a seat assembly having two seat segments which are pivotally connected together, each seat segment having portions defining two corners, the seat assembly having a first seat segment, a second seat segment hingedly connected to the first seat segment; and a downwardly extending spar which is hinged to the first seat segment and the second seat segments, wherein a truss strap extends from the first seat segment, beneath portions of the spar and to the second seat segment to support loads disposed on the seat assembly, wherein the first segment has an array of knuckles which protrude toward an identical array of knuckles on the second segment, the knuckles being spaced from one another to define a plurality of gaps into which a plurality of knuckles extend upwardly from the spar, and wherein a pin extends through the adjacent knuckles to pivotably connect the spar to the first seat segment and the second seat segment, wherein the spar has an upper slot positioned beneath the seat segments, and wherein two cross straps extend beneath the seat segments and through the upper slot, each cross strap having two ends which extend through corner slots in the seat segments and which are connected to the upper straps;

cross straps which extend beneath the seat assembly, the cross straps having ends which extend upwardly through slots in the seat segments at the corners;

a central ring positioned above the seat assembly;

two upper straps each having an end which is connected to a cross strap end which extends from one of the seat assembly corner slots, wherein the two upper straps are connected to the central ring, and wherein the upper straps are adjustable in length to control the distance between the central ring and each of the seat assembly corners;

a securing strap which extends upwardly from the central ring, the securing strap being capable of encircling a tree and releasably fastened to itself to form a loop which supports the central ring and the supported seat assembly from the tree; and a back strap which extends from the central ring and which can be looped about a hunter whose legs extend between the upper straps and the seat assembly, the back strap releasably forming an encircling loop around the hunter to restrain the hunter with respect to the central ring and the seat assembly.

23. A tree climbing and hunter supporting apparatus comprising:

a seat assembly having two seat segments which are pivotably connected together, each seat segment having portions defining two corners;

cross straps which extend beneath the seat assembly, the cross straps having ends which extend upwardly through slots in the seat segments at the corners;

a central ring positioned above the seat assembly;

two upper straps each having an end which is connected to a cross strap end which extends from one of the seat assembly corner slots, wherein the two upper straps are connected to the central ring, and wherein the upper straps are adjustable in length to control the distance between the central ring and each of the seat assembly corners;

a securing strap which extends upwardly from the central ring, the securing strap being capable of encircling a tree and releasably fastened to itself to form a loop which supports the central ring and the supported seat assembly from the tree; and a back strap which extends from the central ring and which can be looped about a hunter whose legs extend between the upper straps and the seat assembly, the back strap releasably forming an encircling loop around the hunter to restrain the hunter with respect to the central ring and the seat assembly, wherein the securing strap comprises:

a first segment which is terminated by an upper buckle; and a second segment of strap which is formed into a loop at a first end and which extends into and is adjustably received within the first segment upper buckle at a second end, wherein the first segment extends through the second segment loop, such that when the securing strap encircles a tree the first segment is slidably disposed within the loop such that downward force on the first segment causes the securing strap to be tightened around the tree.

* * * * *

UNITED STATES PATENT AND TRADEMARK OFFICE
CERTIFICATE OF CORRECTION

PATENT NO. : 6,035,966
DATED : March 14, 2000
INVENTOR(S) : Kenneth D. Lewis

It is certified that error appears in the above-indentified patent and that said Letters Patent is hereby corrected as shown below:

In column 10, line 22 of the issued patent "the scat" should be -- the seat --

Signed and Sealed this

Thirteenth Day of March, 2001

*Attest:*

NICHOLAS P. GODICI

*Attesting Officer*  *Acting Director of the United States Patent and Trademark Office*